«12» United States Patent
Quinton et al.

(10) Patent No.: US 9,170,603 B2
(45) Date of Patent: Oct. 27, 2015

(54) TIME-CORRELATION OF DATA

(75) Inventors: Bradley R. Quinton, Vancouver (CA);
Andrew M. Hughes, Vancouver (CA);
Steven J. E. Wilton, Vancouver (CA)

(73) Assignee: TEKTRONIX, INC., Beaverton, OR (US)

( * ) Notice: Subject to any disclaimer, the term of this patent is extended or adjusted under 35 U.S.C. 154(b) by 321 days.

(21) Appl. No.: 13/558,689

(22) Filed: Jul. 26, 2012

(65) Prior Publication Data

US 2013/0297960 A1 Nov. 7, 2013

Related U.S. Application Data

(60) Provisional application No. 61/611,798, filed on Mar. 16, 2012.

(51) Int. Cl.
*G06F 1/12* (2006.01)
*G06F 11/26* (2006.01)
(52) U.S. Cl.
CPC . *G06F 1/12* (2013.01); *G06F 11/26* (2013.01)
(58) Field of Classification Search
CPC .................................. G06F 1/12; G06F 11/26
USPC ...................................................... 713/400, 401
See application file for complete search history.

(56) References Cited

U.S. PATENT DOCUMENTS 8,327,029 B1 * 12/2012 Purser ........................... 709/248
2007/0271536 A1 * 11/2007 Seawright et al. ................ 716/5

* cited by examiner

*Primary Examiner* — Thuan Du
(74) *Attorney, Agent, or Firm* — David A. Crowther Law PC; Marger Johnson; Thomas F. Lenihan

(57) ABSTRACT

Test and measurement instrumentation collects time information independently in each clock domain using a device that monotonically changes state with the passage of time according to a local clock domain. The device under test therefore has a unique state for each synchronous time period. The instrumentation periodically samples the devices under test, collects the state of each device, and records the state of the devices in conjunction with any data collected in clock domains that are synchronous with the devices. The periodic samples are transformed into numeric values using an isomorphic or linear model. These values are then fitted to an assumed frequency model that relates the state of devices in otherwise unrelated clock domains.

12 Claims, 6 Drawing Sheets

US 9,170,603 B2

TIME-CORRELATION OF DATA

CROSS-REFERENCES TO RELATED APPLICATIONS

This application claims the benefit of commonly assigned U.S. Provisional Application No. 61/611,798, filed Mar. 16, 2012, which is hereby incorporated by reference in its entirety.

BACKGROUND

Embodiments of the present invention relate to embedded instruments, and more particularly, to systems and methods for time-correlating data from different embedded instruments, which need not have a common reference.

As systems become more complex, there is a need to measure performance or functionality using built-in or embedded instruments, which are proximally located to application circuitry within the system. In addition, there is a need to be able to relate (or time-correlate) data that has been collected in different parts of the system to gain a deeper understanding of the overall system behavior. In many cases, different parts of the system have different local time references or clock domains, which are used to sample data relative to the local reference or clock domain.

A conventional solution to the problem of time-correlating or synchronizing data from different sources is to distribute a common (i.e., global) reference signal through a carefully managed network to the sampling locations. This common reference is sampled along-side the data and then is used to relate data collected in different parts of the system. This technique is non-optimal or impossible in some systems where it is difficult or impossible to distribute a carefully managed common reference timing signal. This is true for applications having embedded instrumentation, external instrumentation, as well as for applications in which different instrumentation is spread over different devices.

Quite often, a system may be entirely contained on a chip. The system may include different embedded instruments, which may use the same or different local time references. Because of the practicalities of chip design, designers often complete one block of the design and then move onto next, and would rather avoid going back and redistributing the carefully timed common reference signal to other parts of the chip, particularly if the common reference signal is only to be used in debugging chip functionality. Although building communication paths themselves between different parts of the system is not it itself a particularly large challenge, accounting for a carefully timed global reference signal is a significant challenge, which can be made even more difficult due to timing delays, and the like, which are inherent in circuitry and paths between different components of the system or external systems.

Power islands introduce a further impediment to the conventional approach. Power islands are power savings techniques used in application-specific integrated circuits (ASICs), where certain portions of the chip are periodically powered down. It is difficult or impossible to distribute a uniform, consistent, global clock reference when different portions of the chip can be powered down at different times.

Moreover, in some cases, designers will prototype a chip design or ASIC design by spreading different functional blocks across multiple field-programmable gate arrays (FPGAs). The same problem exists, although now it is complicated even further because the common timing reference would need to be distributed between multiple FPGAs, in addition to being distributed between multiple embedded instruments within the FPGAs. Similar complications occur when multiple separate devices, such as external test and measurement instruments, are included in the overall system.

Accordingly, a need remains for an apparatus, system, and method that removes the requirement of a common or global timing reference while still allowing the system to generate time-correlated views of data from disparate sources, with disparate clock references.

Figure 1:
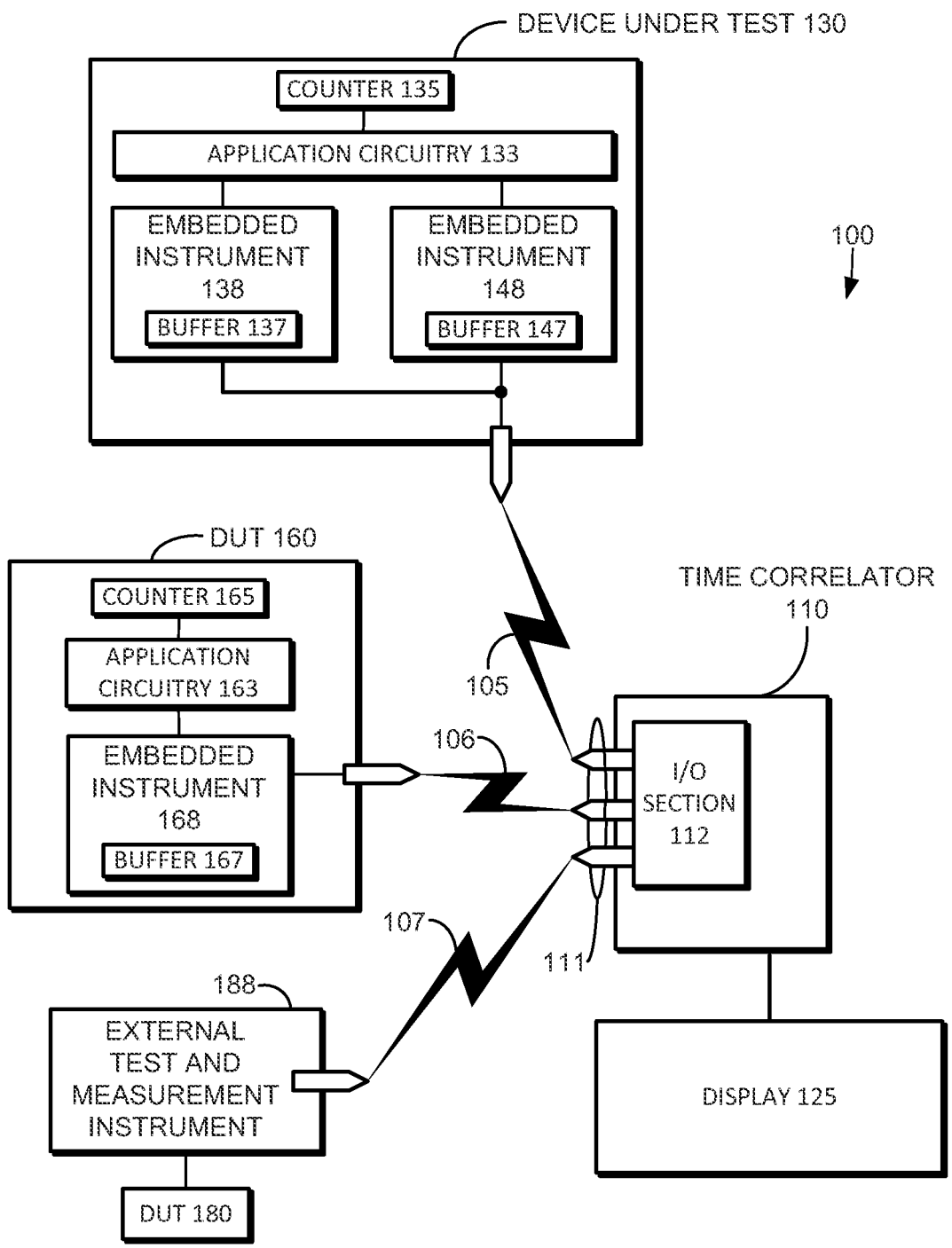
FIG. 1 is an example diagram of a system including a time correlator, which may be connected to various devices and embedded instruments in accordance with some embodiments of the present invention.

The foregoing and other features and advantages of the inventive concepts will become more readily apparent from the following detailed description of the example embodiments, which proceeds with reference to the accompanying drawings.

DETAILED DESCRIPTION

Reference will now be made in detail to embodiments of the present invention, examples of which are illustrated in the accompanying drawings. In the following detailed description, numerous specific details are set forth to enable a thorough understanding of the inventive concepts. It should be understood, however, that persons having ordinary skill in the art may practice the inventive concepts without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first circuit could be termed a second circuit, and, similarly, a second circuit could be termed a first circuit, without departing from the scope of the inventive concept.

The terminology used in the description of the various embodiments herein is for the purpose of describing particular embodiments only and is not intended to be limiting of the inventive concepts. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the invention include systems and methods for collecting information independently in each clock domain about the passage of time using a device (e.g. a counter) that monotonically changes state with the passage of time according to a local clock domain. Devices under test therefore have a unique state for each synchronous time period. The subject apparatus periodically samples the devices under test and collects the state of each device, as well as recording the state of the devices in conjunction with any data collected in clock domains that are synchronous with the devices.

The periodic samples of the state of the device are transformed into numerical values using a predefined model. The predefined model can be, for example, an isomorphic model, which models the evolution of the state of the embedded instruments over time. Alternatively, or in addition to the isomorphic model, a linear model can be used, which relates to the rate of change in one embedded instrument relative to the rate of change in a different embedded instrument. Further, in the linear model, equal numbers of synchronous time periods can become equal values. These values are then fitted to an assumed frequency model that relates the state of devices in otherwise unrelated clock domains. In some embodiments, the linear model is a piecewise linear model and the fitting technique is a linear least squares fitting technique. It will be understood that any arbitrary frequency model can be used, as can any suitable fitting method.

The resulting frequency relation curve is used to infer simultaneous events among the independent clock domains at each sampling event. These simultaneous events are used to time-correlate or otherwise synchronize the independent clock domain data captures. Such time-correlation is performed as a post-hoc analysis on the sampled data after it has been captured and gathered. During the time-correlation, a calibration is performed in which the values of the different counters are correlated among the individual instruments.

As a result, it is possible to collect data from sources with different time or clock domains, and then time-correlate the data even in cases where it is not possible (or desirable) to distribute a common reference.

FIG. 1 is an example diagram of a system 100 including a time correlator 110 connected to various embedded instruments contained within certain devices under test (DUTs) (e.g., 130, 160), as well as to an external test and measurement instrument 188. The external test and measurement instrument 188 is connected to DUT 180. It will be understood that while three different DUTs (e.g., 130, 160, and 180) are illustrated in FIG. 1, any suitable number of DUTs may be simultaneously connected to the time correlator 110 and analyzed together. It will also be understood that the term "embedded instrument" refers to a circuit that is designed into a chip itself, usually located proximately to an application circuit of the chip. The term "external test and measurement instrument" refers to an external instrument such as an oscilloscope, spectrum analyzer, or the like.

The various DUTs may be different in construction or purpose, but generally share the attributes of accessibility and testability by the time correlator 110. The time correlator 110 can be coupled to one or more of the DUTs via the input/output (I/O) section 112, through ports 111, and over connections 105, 106, and/or 107. The connections may be wired or wireless.

A DUT can have one or more embedded instruments. For example, the DUT 130 includes two embedded instruments 138 and 148. Each embedded instrument includes a trace buffer, such as 137 and 147, respectively. The embedded instruments are coupled to application circuitry 133. A counter 135 provides a local timing reference or clock signal to the application circuitry 135 and the embedded instruments 137 and 147. Although the term "counter" is used herein, it will be understood that this term may refer to a free running counter, a clock, a clock signal, a clock circuit, a timing signal, a timing reference, a local clock domain, or the like. The counter provides a view of how time is proceeding according to the individual sampling reference.

The frequency of a counter or clock need not be the same as the frequency of another counter or clock, although some assumptions are made that the clocks do not change too dramatically during the measurements. Any clock disturbance such as clock drift or clock jitter are generally known and bounded, and can be accounted for, or otherwise removed from the analysis. Fixed delays along different paths between different components of a system can also be measured, and considered in the analysis, as further discussed below. The fixed delays are substantially constant, and although they may slightly change, such changes are not dramatic, and need not affect the analysis. Delays across different devices may be an order of magnitude (or thereabout) larger than delays between components on a chip. If new devices are added to a system, then information about fixed delays relative to the new devices can be measured and accounted for. Generally, such errors and delays can be bounded within one clock cycle.

The embedded instruments 137 and 147 of DUT 130 are within the same local clock domain associated with the counter 135. As will be described in further detail below, different embedded instruments may be situated within different local clock domains, even within the same device.

The DUT 160 includes a single embedded instrument 168. The embedded instrument 168 includes a trace buffer 167. The embedded instrument 168 is coupled to application circuitry 163. A counter 165 provides a local timing reference or clock signal to the application circuitry 163 and the embedded instrument 167. The embedded instrument 168 is therefore within a local clock domain associated with the counter 165.

The external test and measurement instrument 188 can also be coupled to the time correlator 110 via connection 107. The DUT 180 can be coupled to the external test and measurement instrument 188 via a probe or other suitable connector. Although not shown, the external test and measurement instrument 188 includes one or more trace buffers and circuitry for measuring signals and state information about the DUT 180, and can store such information in the trace buffers, within a clock domain that is local to the external test and measurement instrument 188.

The embedded instruments can time-stamp events within their independent local clock domains, and store the time-stamped events as state information in their respective trace buffers. For example, the embedded instrument 138 of DUT 130 can time-stamp events in the clock domain associated with the counter 135, and store the time-stamped events as state information in the trace buffer 137, thereby capturing data over a period of time. Meanwhile, the embedded instrument 148 of DUT 130 can also time-stamp events in the clock domain associated with the counter 135, and store the time-stamped events as different state information in the trace buffer 147, thereby capturing additional data over another period of time. The different periods of time can overlap in time. In some embodiments, the different embedded instruments 137 and 147 correspond to an embedded digital scope or analog scope, or any other suitable embedded instrument.

In addition, the embedded instrument 168 of DUT 160 can time-stamp events in the clock domain associated with the counter 165, and store the time-stamped events as different state information in the trace buffer 167, thereby capturing data during a period of time, which may overlap with the periods of time in which data is captured in the DUT 130.

Moreover, the external test and measurement instrument 188 can time-stamp events in the clock domain associated with its own internal counter, and store the time-stamped events as different state information in its own trace buffers, thereby capturing data during a period of time, which may overlap with the periods of time in which data is captured in the DUTs 130 and 160.

The time correlator 110 may sample or otherwise read the state information from the embedded instrument 138 and the embedded instrument 148 by accessing the information stored in the trace buffers 137 and 147, respectively. In addition, the time correlator 110 may sample the state information from the embedded instrument 168 by accessing the information stored in the trace buffer 167. In addition, the time correlator 110 may sample the state information from the external test and measurement instrument 188 pertaining to DUT 180.

The time correlator 110 may transform some or all of the sampled state information into numerical values, fit the numerical values to a frequency model, and time-correlate the different events based at least in part on the frequency model. The time correlator 110 can infer one or more simultaneous events, among all of the events, associated with the different clock domains of the various DUTs 130, 160, and/or 180.

Based at least in part on such inference, the time correlator 110 can generate a time-correlated view of the events aligned in time, including the one or more simultaneous events, and display the time-correlated view on a display 125. The time-correlated view provides a picture of how data changed over time. The time correlator 110 can read or query each instrument before, during, and/or after any particular test or time-correlating analysis, by requesting the local time-stamp(s) associated with a local clock domain, and applying such periodic measurements to the model.

The sampling and synchronization of the events is performed without reference to a global time reference that is common among, or otherwise distributed among, the different embedded instruments. As a result, the design of the individual DUTs, and the functional testing thereof, is simplified and made to be more efficient.

Figure 2:
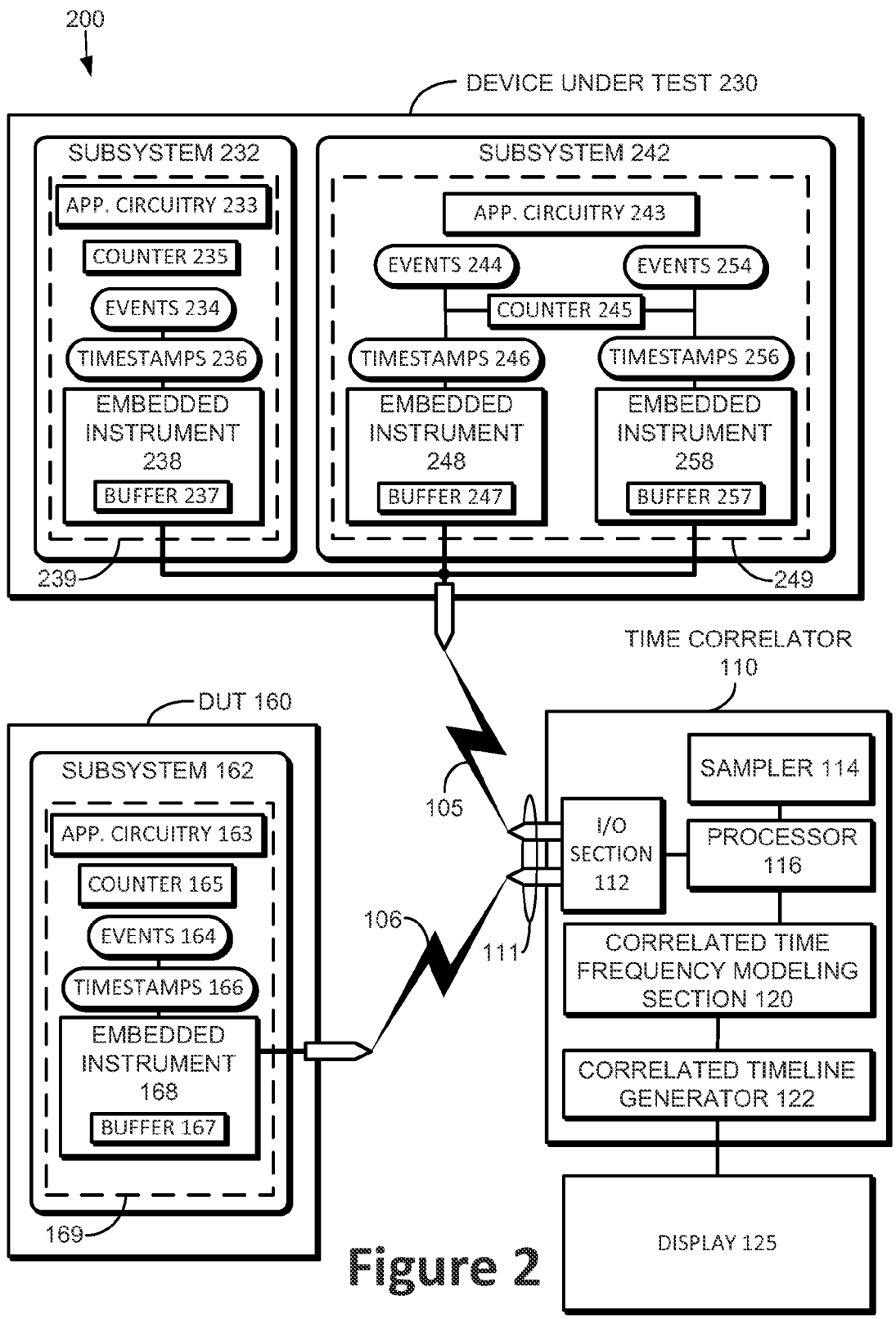
FIG. 2 is an example diagram of a system including the time correlator of FIG. 1, shown with additional detail, and in connection with various devices and embedded instruments in accordance with some embodiments of the present invention.

FIG. 2 is an example diagram of a system 200 including the time correlator 110 of FIG. 1, showing additional detail, and in connection with various devices and embedded instruments in accordance with some embodiments of the present invention.

The time correlator 110 may be connected to the DUT 160 and DUT 230. The time correlator 110 may include, for example, a processor 116, a sampler 114, a correlated time frequency modeling section 120, and/or a correlated timeline generator 122. The processor 116 can coordinate the time-correlation processes and perform other calculations such as transforming sampled information into numerical values during the post-hoc analysis. The sampler 114 can sample the state information from each of the embedded instruments (e.g., embedded instruments 238, 248, 258, and 168). The correlated time frequency modeling section 120 can fit the numerical values to the frequency model. The correlated time frequency modeling section 120 can also perform the inference of the one or more simultaneous events. The correlated timeline generator 122 can produce the time-correlated view of the events for display on the display 125.

The DUT 230 can include different subsystems (e.g., 232 and 242) and different local clock domains (e.g., 239 and 249). For example, the embedded instruments 248 and 258 can be associated with the counter 245 and the local clock domain 249, while the embedded instrument 238 (of the same DUT 230) can be associated with a different counter 235 and local clock domain 239. Each subsystem of the DUT 230 can include different components. By way of example, the subsystem 232 can include application circuitry 233, the counter 235, and the embedded instrument 238. The embedded instrument 238 can include trace buffer 237. By way of another example, the subsystem 242 can include application circuitry 243, the counter 245, the embedded instrument 248, and the embedded instrument 258. The embedded instruments include trace buffers 247 and 257, respectively.

The embedded instrument 238 associated with the local clock domain 239 of DUT 230 can cause timestamps 236 to be associated with the events 234, and store the time-stamped events in the trace buffer 237. More specifically, for each of a plurality of clock cycles, the embedded instrument 238 can time-stamp the events 234. In other words, the embedded instrument 238 can synchronously sample for events or other state information occurring within the application circuitry 233 or other parts of the subsystem 232.

The embedded instrument 248 associated with a different local clock domain 249, but of the same DUT 230, can cause timestamps 246 to be associated with the events 244, and store the time-stamped events in the trace buffer 247. More specifically, for each of a plurality of clock cycles, the embedded instrument 248 can time-stamp the events 244. In other words, the embedded instrument 248 can synchronously sample for events or other state information occurring within the application circuitry 243 or other parts of the subsystem 242.

Similarly, the embedded instrument 258 associated with the local clock domain 249 and the same DUT 230 can cause timestamps 256 to be associated with the events 254, and store the time-stamped events in the trace buffer 257. More specifically, for each of a plurality of clock cycles, the embedded instrument 258 can time-stamp the events 254. In other words, the embedded instrument 258 can synchronously sample for events or other state information occurring within the application circuitry 243 or other parts of the subsystem 242.

The state information stored in the trace buffers 237, 247, and 257 of the DUT 230 can be routed to the time correlator 110 via connection 105 for further processing. Alternatively, or in addition to, the time correlator 110 can sample the state information from each of the trace buffers 237, 247, and 257.

The DUT 160 can include a subsystem 162 and a single clock domain 169. For example, the embedded instrument 168 can be associated with the counter 165 and the local clock domain 169. The subsystem 162 can include application circuitry 163, the counter 165, and the embedded instrument 168. The embedded instrument 168 can include the trace buffer 167.

The embedded instrument 168 associated with the local clock domain 169 of DUT 160 can cause timestamps 166 to be associated with the events 164, and store the time-stamped events in the trace buffer 167. More specifically, for each of a plurality of clock cycles, the embedded instrument 168 can time-stamp the events 164. In other words, the embedded instrument 168 can synchronously sample for events or other state information occurring within the application circuitry 163 or other parts of the subsystem 162. Although only one subsystem 162 is shown, it will be understood that the DUT 160 can include any suitable number of subsystems and embedded instruments.

The state information stored in the trace buffer 167 of the DUT 160 can be routed to the time correlator 110 via connection 106 for further processing. Alternatively, or in addition to, the time correlator 110 can sample the state information from each of the trace buffers 167, 237, 247, and 257, and synchronize or otherwise time-correlate the different events occurring in different DUTs and different subsystems of the DUTs, and align the events in a time-correlated view during a post-hoc procedure, without having access to or otherwise distributing a common timing reference. Time-correlating performed by the time correlator 110 can include determining how the time-stamped events relate between the various embedded instruments, and time-correlating the events based at least in part on the time-stamped events.

Figure 3:
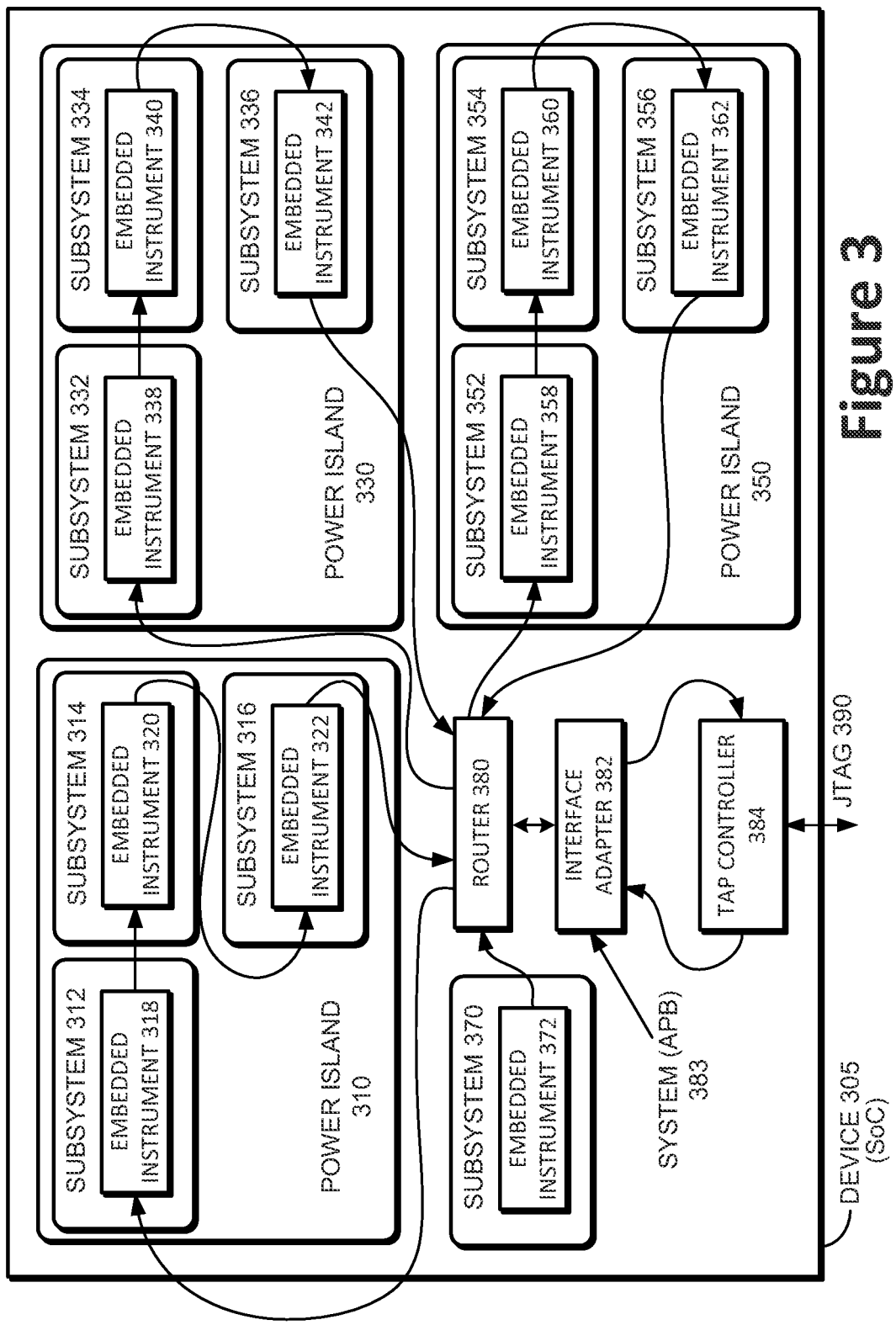
FIG. 3 is an example diagram of a system on a chip, including various embedded instruments and communication paths, in accordance with some embodiments of the present invention.

FIG. 3 is an example diagram of a system on a chip 305 device, including various embedded instruments and communication paths, in accordance with some embodiments of the present invention. The device 305 can include a multiplicity of subsystems. Subsystems may be grouped into different power islands. For example, subsystems 312, 314, and 316 may be associated with power island 310. Subsystems 332, 334, and 336 may be associated with power island 330. Subsystems 352, 354, and 356 may be associated with power island 350. One or more independent subsystems, such as subsystem 370, may not be associated with any power island.

The power islands provide a power savings technique, where certain portions of the chip (i.e., the power islands) are periodically powered down. Even where such powering down may occur, the embedded instruments associated with the subsystems that are not powered down continue to operate. By way of example, if the power island 330 is powered down, meaning that the embedded instruments 338, 340, and 342 are likewise powered down, the other subsystems and associated embedded instruments continue to operate. There is no cut-off of a global timing reference due to broken connectivity paths between subsystems, because such global timing reference is not needed in accordance with the inventive concepts disclosed herein. Such feature simplifies the chip design.

More specifically, the embedded instruments 318, 320, and 322 of subsystems 312, 314, and 316, respectively, continue to operate (i.e., continue to timestamp and store events into their respective buffers). Similarly, the embedded instruments 358, 360, and 362 of subsystems 352, 354, and 356, respectively, continue to operate. Moreover, the embedded instrument 372 of subsystem 370 continues to operate.

Whether one or more power islands are powered down or not, the state information stored in the various embedded instruments 322 can be routed through the router 380 to the interface adapter 382. An advanced peripheral bus 383 of the system can also be coupled to the interface adapter 382. The interface adapter 382 can communicate with a test access port (TAP) controller 384, which interfaces with a test port such as a Joint Test Action Group (JTAG) port 390. The time correlator 110 (of FIGS. 1 and 2) can access the state information of the various subsystems via, for example, the JTAG port 390.

Figure 4:
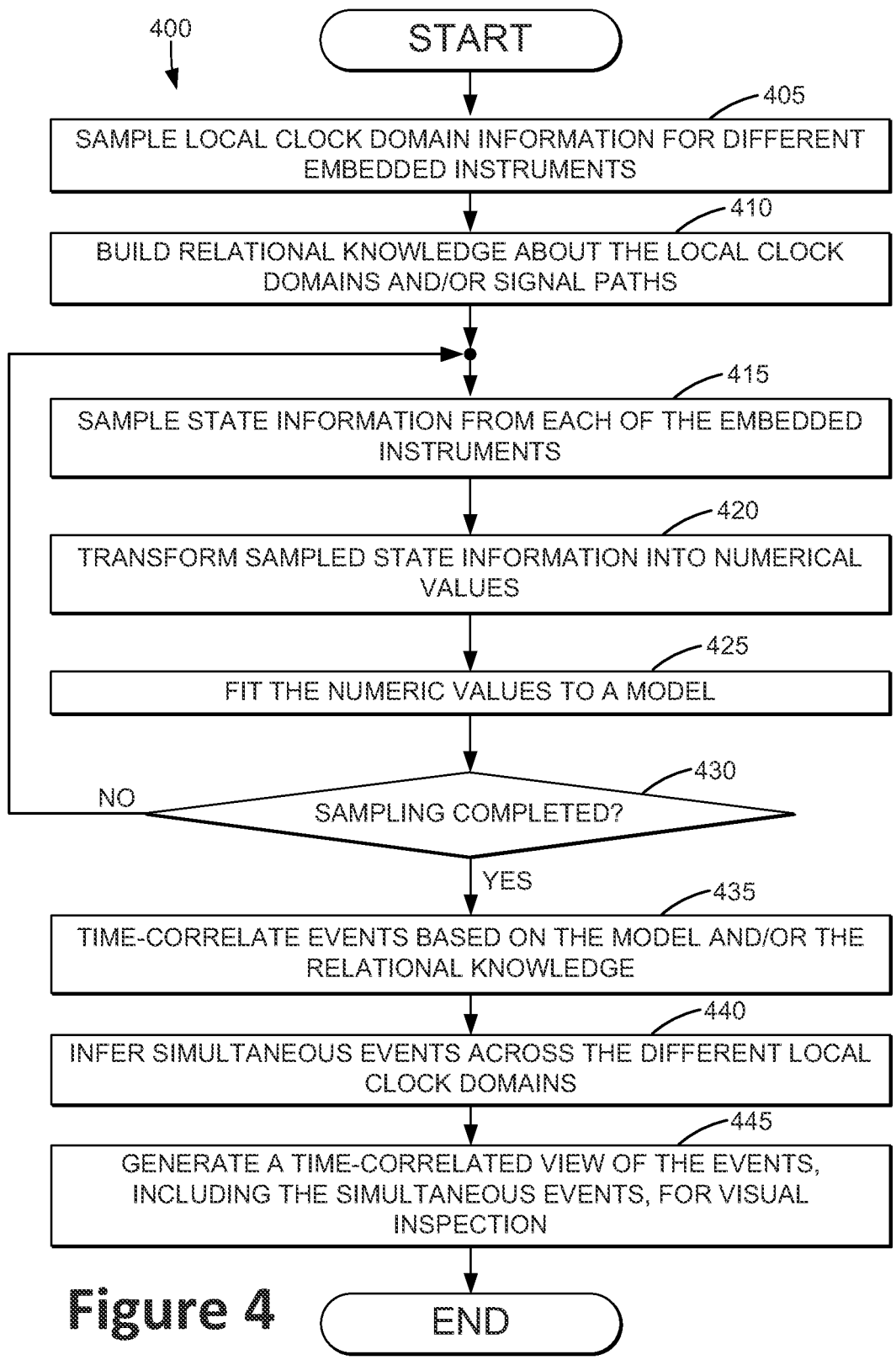
FIG. 4 is an example flow diagram illustrating a technique for time-correlating events across multiple different local clock domains, according to some embodiments of the present invention.

FIG. 4 is an example flow diagram 400 illustrating a technique for time-correlating events across multiple different local clock domains, according to some embodiments of the present invention. The technique begins at 405, where local clock domain information is sampled for different embedded instruments. The embedded instruments may be associated with the same or different local clock domains. At 410, the time correlator (of FIGS. 1 and 2) can build relational knowledge about the local clock domains and/or signal paths and/or delays between the various components of the system(s).

The flow proceeds to 415, where state information is sampled from each of the embedded instruments. The sampled state information is transformed at 420 into numerical values using an isomorphic or linear model as explained above. At 425, the numerical values are fitted to a frequency model that relates the state of the devices in otherwise unrelated clock domains. As mentioned above, the linear model can be a piecewise linear model and the fitting technique can be a linear least squares fitting technique. It will be understood that any arbitrary frequency model can be used, as can any suitable fitting method.

A determination can be made at 430 whether the sampling by the time correlator is completed. If NO, the flow returns to 415 and additional state information can be sampled from the various embedded instruments of the devices under test. Such periodic sampling need not occur in real-time. In other words, given that the embedded instruments individually and synchronously sample events and other state information, and store such data captures in corresponding local trace buffers, the time correlator 110 can sample or otherwise read such data captures as needed, and then process the state information for all of the embedded instruments to produce the time-correlated view of events.

If the determination is YES, meaning the sampling by the time correlator 110 has completed, then the flow proceeds to 435, where the events or other state information across the various embedded instruments is synchronized or otherwise time-correlated based on the predetermined frequency model and/or the relational knowledge previously gathered at 405 and 410. The time correlator 110 can infer one or more simultaneous events across the different local clock domains at 440, and generate a time-correlated view of the events at 445, which can include the one or more simultaneous events. The time-correlated view can be visually inspected on the display 125.

It should be understood that the determinations in the flow diagram 400 need not occur in the specific order as described, but rather, these determinations can be made at different times. It will also be understood that the steps described in these techniques need not necessarily occur in the order as illustrated or described.

Figure 5:
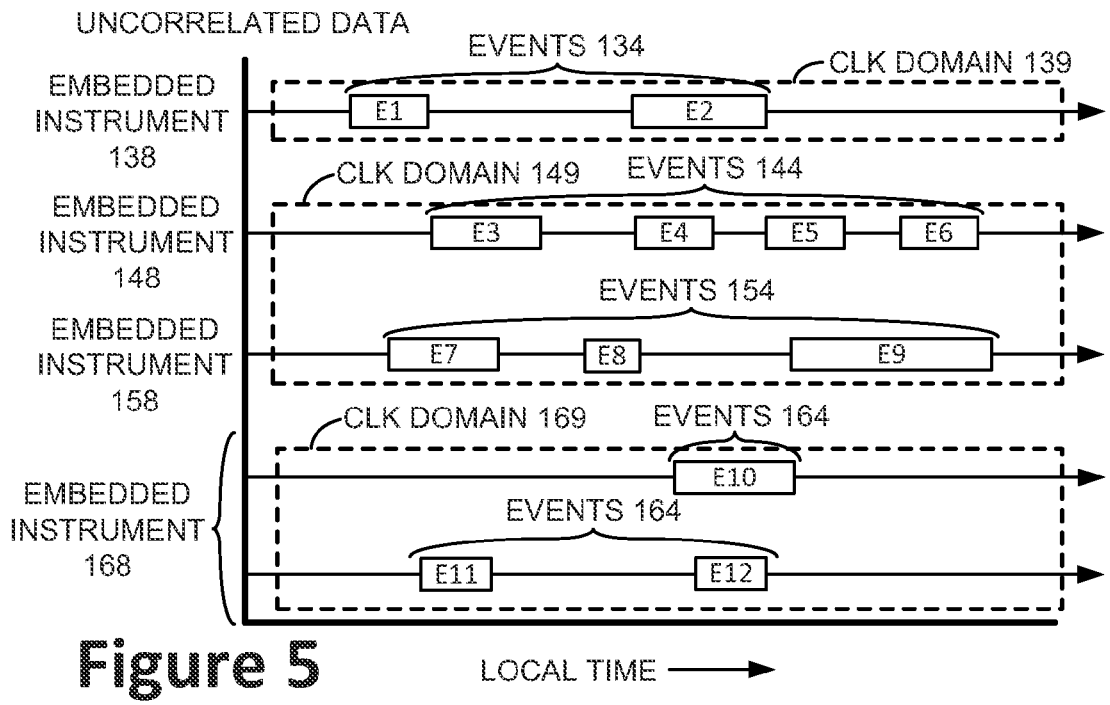
FIG. 5 is an example graph with respect to time of uncorrelated data associated with the different embedded instruments of FIG. 2.

FIG. 5 is an example graph with respect to time of uncorrelated data associated with the different embedded instruments of FIG. 2. For example, the embedded instrument 138 can record or otherwise time-stamp the events E1 and E2 relative to the local clock domain 139. The embedded instrument 148 can record or otherwise time-stamp the events E3, E4, E5, and E6 relative to the local clock domain 149. The embedded instrument 158 can record or otherwise time-stamp the events E7, E8, and E9 relative to the local clock domain 149 (i.e., the same clock domain as used by the embedded instrument 148).

It will be understood that the embedded instruments can record different series of events, or otherwise generate different waveforms associated with different events. By way of example, the embedded instrument 168 can generate two different data captures or series of time-stamped events. The first data capture can include event E10. The second data capture can include events E11 and E12. The events E10, E11, and E12 can be recorded or otherwise time-stamped relative to the local clock domain 169.

Figure 6:
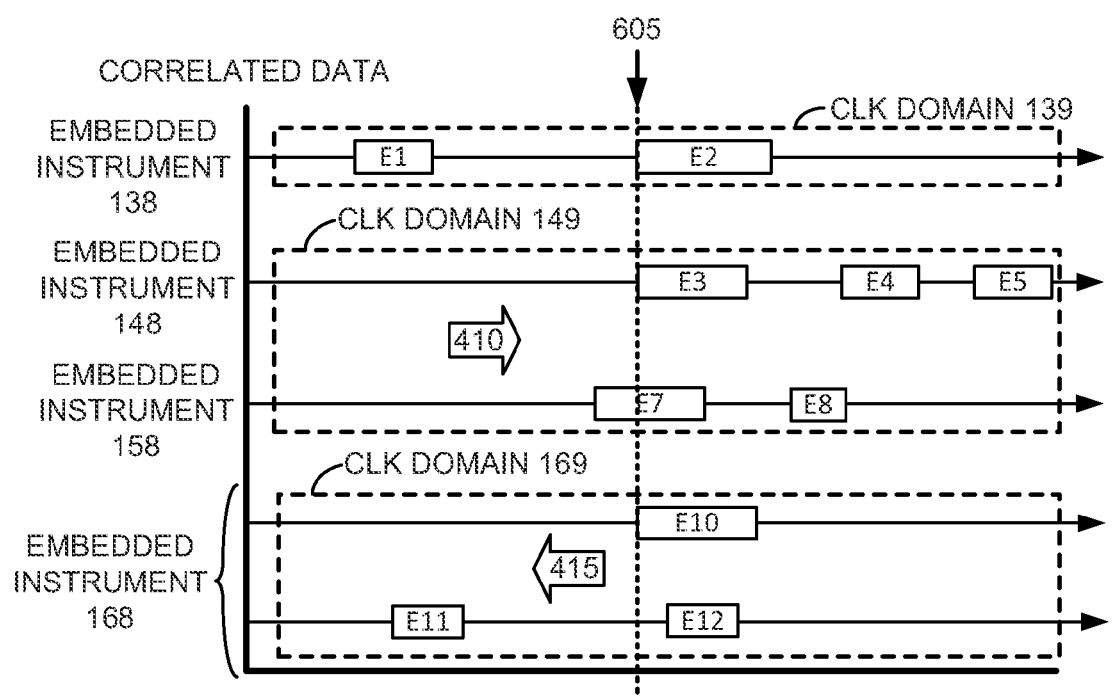
FIG. 6 is an example graph with respect to time of correlated data associated with the different embedded instruments of FIG. 2, in accordance with some embodiments of the present invention.

FIG. 6 is an example graph with respect to time of correlated data associated with the different embedded instruments of FIG. 2, in accordance with some embodiments of the present invention. The time-correlated view of FIG. 6 shows how events can be shifted so that they are aligned in a constructed correlated timeline relative to each other, across the different clock domains. The constructed correlated timeline is generated consistent with the sampling measurements from the various embedded instruments. For instance, the time correlator 110 can infer that events E2, E3, and E10 are simultaneous events.

Such inference is made possible by introducing a known degree of causality in the test infrastructure. Put differently, predefined events having a known relationship to a local time or clock domain are created using the various embedded instruments. Then, the known causality can be extrapolated to the observed events sampled by the time correlator 110. The known causality that is introduced in the local time or clock domain is under the control of the embedded instruments and/or the time correlator 110, and the extrapolation function can be determined by the models, as described above. To some extent, although the "real" timeline is not entirely known, any differences between the constructed correlated timeline and the "real" timeline can be measured and minimized. In other words, similar to the calculus of variations, the system searches for a timeline that minimizes any causal violations, and based on that information, produces the constructed correlated timeline.

In order to align the waveforms properly in the constructed correlated timeline, the events associated with the local clock domain 149 are shifted to the right as indicated by arrow 410. In addition, the events associated with the local clock domain 169 are shifted to the left, as indicated by the arrow 415. Thus, the information from the different devices is aligned as indicated by arrow 605, and the state information of the various devices is correlated to the constructed correlated timeline, relative to each other. In other words, a determination can be made that time "X" for one embedded instrument is the same time as time "Y" for another embedded instrument, and the individual timelines can be adjusted accordingly. An engineer or other qualified person can then view events across disparate systems as they actually happened in time relative to each other.

In this manner, causality between events can be discovered. In other words, one event detected and time-stamped by one embedded instrument may have caused another event detected and time-stamped by another embedded instrument. By having a view of all events, which are aligned in the constructed correlated timeline relative to each other, such cause and effect relationships can be ascertained.

Figure 7:
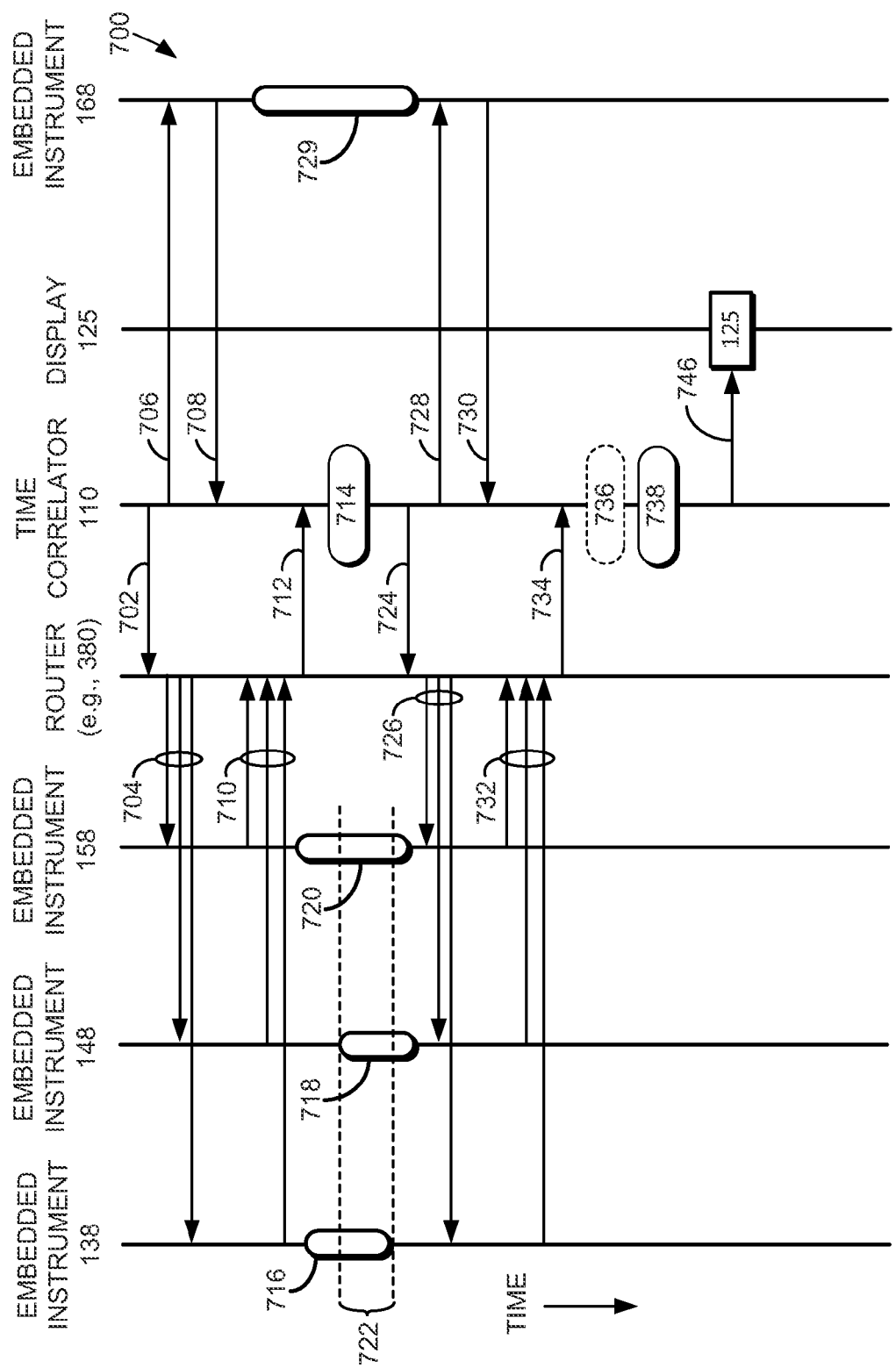
FIG. 7 is an example flow diagram showing interactions between the time correlator and the different embedded instruments and devices of FIG. 2, in accordance with some embodiments of the present invention.

FIG. 7 is an example flow diagram 700 showing interactions between the time correlator and the different embedded instruments and devices of FIG. 2, in accordance with embodiments of the present invention. Time flows downward relative to the diagram. The technique begins at the top of the diagram, where the time correlator 110 sends request 702, which is routed through a router such as 380 (of FIG. 3), and forwarded to embedded instruments 138, 148, and 158. The request 702 can sample local clock domain information. The various embedded instruments can send replies 710 including the requested information, which can be forwarded by the router as a stream of state information 712 back to the time correlator 110. Meanwhile, the time correlator can be querying the separate embedded instrument 168 via request 706 and reply 708.

At 714, the time correlator 110 can build relational knowledge about the local clock domains. Information about signal paths or other unique characteristics of the various devices, which may affect communication delays, or the like, can also be fed to the correlator 110 manually by an engineer or other qualified person, or automatically from the various embedded instruments.

The individual embedded instruments can obtain data captures of state information according to their individual clock domains. For example, as shown at 716, the embedded instrument 138 can capture state information over a period of time. The embedded instrument 148 can capture its own state information over a period of time 718. In addition, the embedded instrument 158 can capture its own state information over a period of time 720. Similarly, the embedded instrument 168 can capture its own state information over a period of time 729. The data captures can overlap in time, as indicated by 722. The data captures can be initiated based on a trigger and associated trigger criteria in each of the embedded instruments. The time correlator 110 can sample the data captures from the various embedded instruments as shown by requests 724 and 726, and the corresponding replies 732 and 734. In addition, the time correlator 110 can sample the data capture(s) from the embedded instrument 168 as shown by request 728 and the corresponding reply 730.

At 736, further periodic sampling may optionally be performed until a sufficient amount of state information is known about the various embedded instruments and the data captured therein. At 738, the sampled information may be processed by the time correlator 110, as described in detail above, and the time-correlated view of the data can be transmitted at 746 to the display 125 for visual analysis.

It should be understood that the determinations in the flow diagram 700 need not occur in the specific order as described, but rather, these determinations can be made at different times. It will also be understood that the steps described in these techniques need not necessarily occur in the order as illustrated or described.

Although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciated that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access. Embodiments of the inventive concept may include a non-transitory machine-readable medium comprising instructions executable by one or more processors, the instructions comprising instructions to perform the elements of the inventive concept as described herein.

Other similar or non-similar modifications can be made without deviating from the intended scope of the inventive concept. Accordingly, the inventive concept is not limited except as by the appended claims.

What is claimed is:

1. The method for time-correlating data, the method comprising:
    sampling state information from a plurality of embedded instruments situated within different clock domains;
    transforming the sampled state information into numerical values;
    fitting the numerical values to a model;
    time-correlating a plurality of events based at least in part on the model; and
    inferring one or more simultaneous events, among the events, across the different clock domains;
    for each of a first plurality of clock cycles, time-stamping, by a first embedded instrument from among the plurality of embedded instruments, the first embedded instrument being situated in a first clock domain, first events associated with the first plurality of clock cycles;
    for each of a second plurality of clock cycles, time-stamping, by a second embedded instrument from among the plurality of embedded instruments, the second embedded instrument being situated in a second clock domain different from the first clock domain, second events associated with the second plurality of clock cycles;
    storing the first time-stamped events in a first buffer as first state information associated with the first embedded instrument;
    storing the second time-stamped events in a second buffer as second state information associated with the second embedded instrument;
    reading the first state information from the first buffer associated with the first embedded instrument situated within the first clock domain;
    reading the second state information from the second buffer associated with the second embedded instrument situated within the second clock domain;
    inferring the one or more simultaneous events across the first and second clock domains;
    generating a time-correlated view of the events, including the one or more simultaneous events; and
    displaying the time-correlated view on a display for visual inspection.

2. A system for time-correlating data, the system comprising:
    a first embedded instrument associated with a first clock domain and a first buffer, the first embedded instrument being configured to time-stamp first events in the first clock domain and store the time-stamped first events as first state information in the first buffer;
    a second embedded instrument associated with a second clock domain and a second buffer, the second embedded instrument being configured to time-stamp second events in the second clock domain and store the time-stamped second events as second state information in the second buffer; and
    a time correlator device communicatively coupled to the first and second embedded instruments, the time correlator device configured to:
        sample the first state information from the first embedded instrument;
        sample the second state information from the second embedded instrument;
        transform the sampled first and second state information into numerical values;
        fit the numerical values to a model;
        time-correlate the first events and the second events based at least in part on the model; and
        infer one or more simultaneous events, among the first events and the second events, across the first and second clock domains.

3. The system of claim 2, wherein the first and second embedded instruments are embedded in a first device, the system further comprising: a second device separate from the first device, the second device comprising a third embedded instrument, the third embedded instrument being associated with a third clock domain and a third buffer, the third embedded instrument being configured to time-stamp third events in the third clock domain, and to store the time-stamped third events as third state information in the third buffer.

4. The system of claim 3, wherein the time correlator device is configured to:
    sample the third state information from the third embedded instrument;
    transform the sampled first, second, and third state information into numerical values;

fit the numerical values to the model;
time-correlate the first events, the second events, and the third events based at least in part on the model; and
infer one or more simultaneous events, among the first events, the second events, and the third events, across the first, second, and third clock domains.

5. The system of claim 2, wherein the correlator device is further configured to generate a time-correlated view of the first events and the second events, including the one or more simultaneous events.

6. The system of claim 5, further comprising:
a display configured to display the time-correlated view for visual inspection.

7. The system of claim 5, wherein the time correlator device is further configured to align in time, relative to each other, the first events and the second events, across the first and second clock domains, without having access to a time reference that is common to the first and second embedded instruments.

8. The system of claim 2, wherein the first and second embedded instruments are configured to introduce a known degree of causality, and wherein the time correlator device is configured to extrapolate the known degree of causality to the one or more simultaneous events.

9. A system for time-correlating data, the system comprising:
a first embedded instrument associated with a first clock domain and a first buffer, the first embedded instrument being configured to time-stamp first events in the first clock domain and store the time-stamped first events as first state information in the first buffer;
a second embedded instrument associated with a second clock domain and a second buffer, the second embedded instrument being configured to time-stamp second events in the second clock domain and store the time-stamped second events as second state information in the second buffer; and
an external test and measurement instrument associated with a third clock domain and a third buffer, the external test and measurement instrument being configured to time-stamp third events in the third clock domain and store the time-stamped third events as third state information in the third buffer.

10. The system of claim 9, further comprising:
a time correlator device communicatively coupled to the first and second embedded instruments and to the external test and measurement instrument, the time correlator device configured to:
sample the first state information from the first embedded instrument;
sample the second state information from the second embedded instrument;
sample the third state information from the external test and measurement instrument;
transform the sampled first, second, and third state information into numerical values;
fit the numerical values to a model;
time-correlate the first events, the second events, and the third events based at least in part on the model; and
infer one or more simultaneous events, among the first events, the second events, and the third events, across the first, second, and third clock domains.

11. The system of claim 10, wherein the correlator device is further configured to:
generate a time-correlated view of the first events, the second events, and the third events, including the one or more simultaneous events; and
align in time, relative to each other, the first events, the second events, and the third events, across the first, second, and third clock domains, without having access to a time reference that is common to the first embedded instrument, the second embedded instrument, and the external test and measurement instrument.

12. The system of claim 11, further comprising:
a display configured to display the time-correlated view for visual inspection.

* * * * *